Jan. 31, 1967   A. R. D'ALBA ETAL   3,301,137
WINDSHIELD WIPER
Filed March 12, 1964   3 Sheets-Sheet 1

INVENTORS
ANTHONY R. D'ALBA and
RAYMOND A. DEIBEL
BY
E. Herbert Liss
ATTORNEY.

INVENTORS
ANTHONY R. D'ALBA and
RAYMOND A. DEIBEL
BY *E. Herbert Liss*
ATTORNEY.

Jan. 31, 1967  A. R. D'ALBA ETAL  3,301,137
WINDSHIELD WIPER
Filed March 12, 1964  3 Sheets-Sheet 3
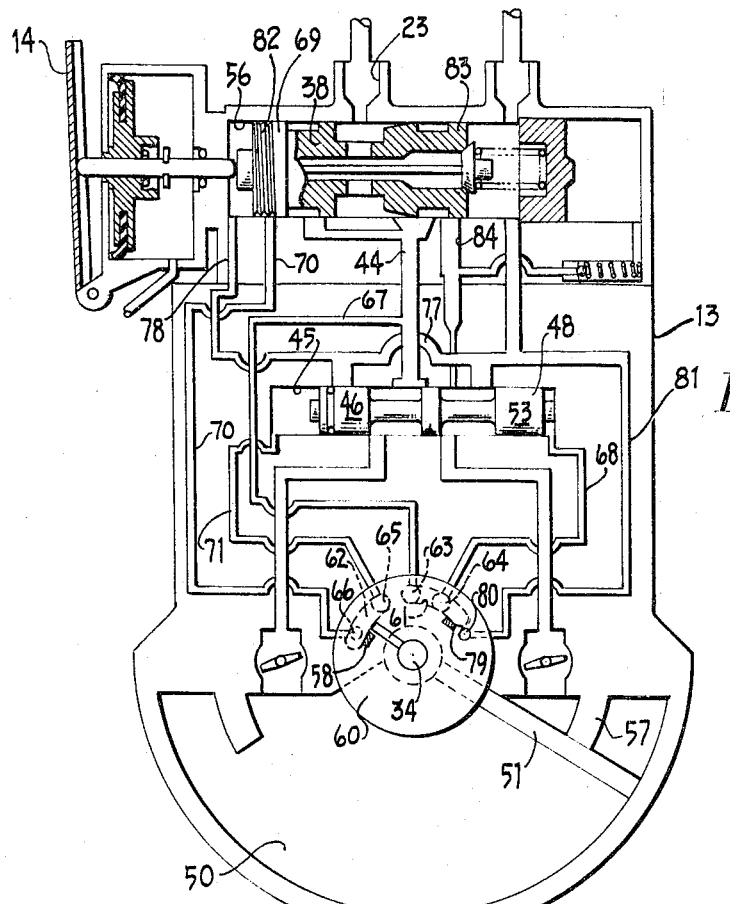
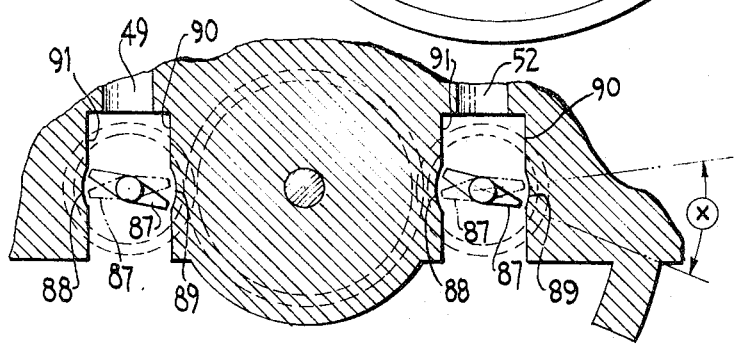
INVENTOR.
ANTHONY R. D'ALBA and
RAYMOND A. DEIBEL
BY
ATTORNEY.

United States Patent Office 3,301,137
Patented Jan. 31, 1967

3,301,137
WINDSHIELD WIPER
Anthony R. D'Alba, Williamsville, and Raymond A. Deibel, Cheektowaga, N.Y., assignors to Trico Products Corporation, Buffalo, N.Y.
Filed Mar. 12, 1964, Ser. No. 351,414
4 Claims. (Cl. 91—219)

The present invention relates to an improved hydraulic windshield wiper motor.

It is an important object of the present invention to provide an improved hydraulic windshield wiper motor which is not only capable of providing conventional type of operation including automatic parking but which is also capable of selectively producing intermittent operation with intervening dwell periods between successive cycles of motor movement in an extremely simple and efficient manner.

Another object of the present invention is to provide an improved hydraulic windshield wiper motor which includes an arrangement which tends to obviate the possibility that the wiper motor will impose a load on the hydraulic pump of the system for prolonged periods of time after the wiper motor has terminated operation.

A further object of the present invention is to provide structure which insures that the wiper motor moves from a running position to a parking position smoothly and quietly thereby obviating any slamming which might occur when the wipers driven by the wiper motor come to rest against the bottom molding of a windshield. Other objects and attendant advantages of the present invention will readily be perceived hereafter.

The improved hydraulic wiper motor of the present invention is of the oscillatory type in which a piston is caused to oscillate back and forth by the alternate routing of high pressure fluid to opposite sides thereof while exhausting low pressure fluid from the side of the piston which is not subjected to high pressure fluid, said routing being effected by the use of a pilot valve driven by the piston and a shuttle valve operable in response to the action of the pilot valve, as is conventional in the art. The motor includes a main control valve which is manually manipulatable to cause the wiper motor to either run continuously or to move to a parked position. In accordance with the present invention the main control valve, noted above, is modified so as to selectively meter hydraulic fluid to one side of the shuttle valve, when the control valve is set in a predetermined position, to thereby cause the above-mentioned piston to intermittently provide cycles of movement with intervening rest periods between successive cycles. The foregoing is achieved in an extremely simple manner by a simple modification of the main control valve and the porting associated therewith. In addition, the improved hydraulic wiper motor of the present invention includes a conduit arrangement which prevents the control valve from remaining in a position which will cause the wiper motor to impose a normal running load on the hydraulic pump which supplies fluid to the wiper motor, when the wiper motor is supposed to be in an off position. In accordance with this aspect of the present invention, if for any reason the above-mentioned main control valve does not move to a fully off position, the wiper motor will be caused to cycle occasionally, thereby alerting the vehicle operator to the fact that the main control valve is not in a fully off position. If such cycling is experienced, the vehicle operator need merely manipulate the manual control on the vehicle dashboard to move the control valve to a position wherein the wiper motor is parked, in which position there is no load imposed on the pump which supplies high pressure fluid to the wiper motor. The improved hydraulic wiper motor of the present invention also includes an arrangement which provides dampened movement at opposite ends of piston travel and is constructed in such a manner that when the motor piston moves from its end limit of normal running travel to a parked out-of-the-way position, it does so at a uniform low rate of speed to thereby provide a "soft park" and thereby obviate any possibility that the wipers, which are driven by the wiper motor, will slam against the bottom molding of the windshield. The present invention will be more fully understood when the following portions of the specification are read in conjunction with the accompanying drawings wherein:

FIG. 4 is a schematic view of the improved wiper motor of the present invention showing the position which the control valve occupies when the wiper motor is set for intermittent operation, the remainder of the parts of the wiper motor being shown in the position which they occupy when the wiper motor is at rest between successive cycles of wiper motor operation;

FIG. 6 is a diagrammatic view showing the positions of the dampening vanes of the wiper motor at the limit of piston travel and at the position which they occupy when the wiper motor is in a fully parked condition

Figures 1, 2, 7:
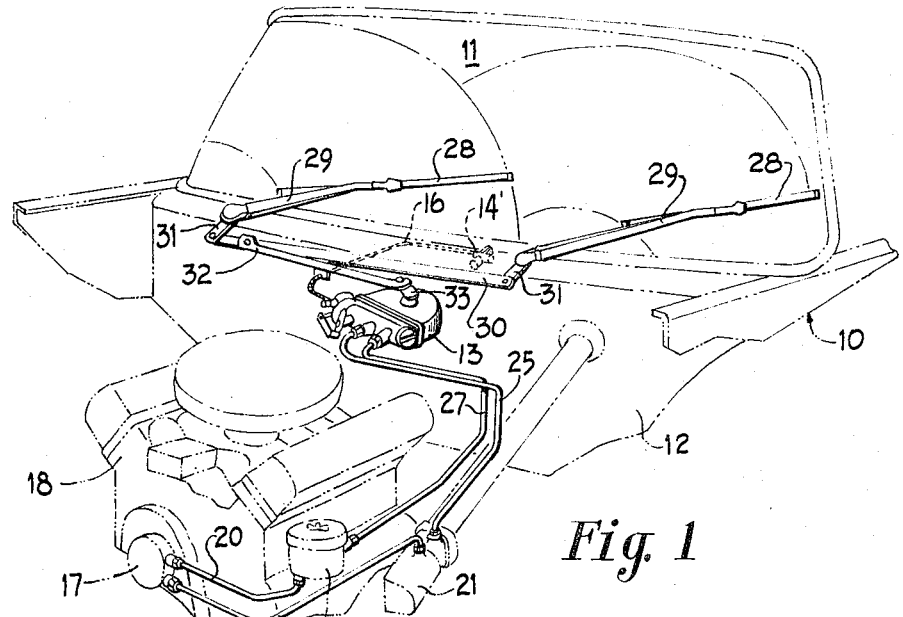
FIG. 1 is a fragmentary perspective view of an automotive vehicle mounting the improved wiper motor of the present invention.
FIG. 2 is a schematic view of the wiper motor of the present invention in its parked position.
FIG. 7 is a fragmentary side elevational view showing a modified control for providing intermittent operation.

In FIG. 1 an automotive vehicle 10 is shown having a windshield 11 mounted thereon in the conventional manner. Suitably mounted on the firewall 12 of the vehicle is hydraulic motor 13 of the present invention. A control 14' is mounted on the vehicle dashboard and is coupled to lever 14 of the wiper motor through a Bowden wire 16, the armor of which is secured to the wiper motor in the same manner as described in patent No. 3,100,423. The source of hydraulic fluid for motor 13 is hydraulic pump 17 which is driven directly from the vehicle engine 18, pump 17 receiving its supply of hydraulic fluid from reservoir 19 through conduit 20. The high pressure hydraulic fluid is conducted to power steering control valve 21 through conduit 22, and the exhaust from control valve 21 is routed into wiper motor inlet 23 in control housing 24 through conduit 25. The hydraulic fluid then passes from wiper motor outlet 26 into conduit 27 leading to reservoir 19, whether the wiper motor is in operation or is parked. The power steering control valve 21 leads hydraulic fluid to a power steering motor (not shown) in response to the manipulation of the steering wheel, as described in detail in application Serial No. 804,491, now Patent Number 3,153,985. Whenever wiper motor 13 is in operation, wipers 28 which are mounted on arms 29 will be oscillated across the windshield in view of the fact that the wiper arms are driven from the output of wiper motor 13 through a suitable linkage consisting of link 30 connecting crankarms 31 which are mounted on rock shafts on which wiper arms 29 are mounted, link 30 being connected to crankarm 33 mounted on wiper motor output shaft 34 by link 32 and driven thereby.

It is to be noted at this juncture that wiper motor 13 is similar to the wiper motor fully described in Patent No. 3,100,423 and therefore a detailed description of all the structural parts of the wiper motor will not be made here, the description being primarily confined to the structure which is different from that disclosed in the above-mentioned patent and the mode of operation of the wiper motor which is necessary to fully explain the function of such different structure.

When the wiper motor 13 is moved to a parked position lever 14 which is pivoted on pin 34 will assume the position shown in FIG. 2 and therefore permit spring 35 which has one end mounted on piston 36 and the other end in abutting engagement with valve 37 to cause movement of control valve 38 to the left, to occupy the position shown in FIG. 2 and therefore move stem 39 to the left into abutting engagement with surface 40 of lever 14. In this position all parts of the wiper motor will assume the positions shown in FIG. 2. The hydraulic fluid which enters inlet 23 from conduit 25 passes between lands 41 and 42 of control valve 38 into conduit 43, conduit 44, into the portion of shuttle valve chamber 45 which lies between lands 46 and 47 of shuttle valve 48, conduit 49, and the portion of wiper motor chamber 50 to the left of piston or vane 51 which is mounted on motor output shaft 34. The portion of chamber 50 to the right of piston 51 is in communication with wiper motor outlet conduit 26 through conduit 52, the portion of shuttle valve chamber 45 between lands 47 and 53, when shuttle valve 48 is in the position shown in FIG. 2, conduit 54, conduit 77, conduit 55, and the portion of control valve chamber 56 which lies between piston 36 and the right hand portion of control valve 38.

The wiper motor piston 51 will be biased slightly in a counterclockwise direction against abutment 57 at one end of chamber 50 because the pressure to the left of piston 51 is greater than the pressure to the right of piston 51 inasmuch as valve 37 causes the entry pressure of the hydraulic fluid entering the wiper motor through inlet conduit 23 to be slightly higher than the pressure leaving outlet conduit 26. It is to be noted that when valve 37 and piston 36 are in the position shown in FIG. 2, the pressure of spring 35 on valve 37 will be relatively light to therefore permit the hydraulic fluid entering wiper motor 13 through conduit 25 to pass between lands 41 and 42, through aperture 42' in valve 38, through longitudinal bore 43' in valve 38 and past valve 37 into the portion of control valve chamber 56 to the right thereof and thence through wiper motor outlet 26 leading to conduit 27. It is to be noted that the light biasing of valve 37 relative to control valve 38 permits the hydraulic fluid to pass through the control chamber of wiper motor 13 in the above-described path without a substantial pressure drop, as fully described in said Patent No. 3,100,423. It thus can be seen that spring 35, piston 36 and valve 37 constitute pressure control means.

It is to be noted at this point that a kicker 58 is mounted for movement with piston 51 and kicker 58 will have engaged abutment 59 mounted on pilot valve 60 and have caused the latter to assume the position shown in FIG. 2 when the wiper motor is in a parked position. At this point it is to be noted that pilot valve 60 has grooves 61 and 62 therein. Groove 61 bridges apertures 63 and 64 when the wiper motor is parked and groove 62 bridges apertures 65 and 66. Therefore the following pressures will be exerted on shuttle valve 48 to cause it to remain in the position shown in FIG. 2 when the wiper motor is parked. The wiper motor inlet pressure in conduit 44 (which is in communication with wiper motor inlet 23) will be exerted in the portion of shuttle valve chamber 45 to the right of land 53 through conduit 67, aperture 63, pilot valve groove 61, aperture 64 and conduit 68. However, it will be noted that the pressure in conduit 43 which is in communication with conduit 44 will be exerted in the portion of shuttle valve chamber 45 which is to the left of land 46 of shuttle valve 48 through the portion of control valve chamber 56 lying between lands 41 and 69 of the control valve (FIG. 2) which is in communication with conduit 43, conduit 70, aperture 66, pilot valve groove 62, aperture 65 and conduit 71. Thus shuttle valve 48 will have equal pressures on opposite ends thereof and therefore remain in a pressure balanced condition while the wiper motor is parked. As will become more apparent hereafter, the shuttle valve 48 moves to the position shown in FIG. 2 before the portion of shuttle valve chamber 45 to the right of land 53 is exposed to inlet pressure, thereby assuring that the shuttle valve 48 is pressure balanced in the position shown.

Figure 3:
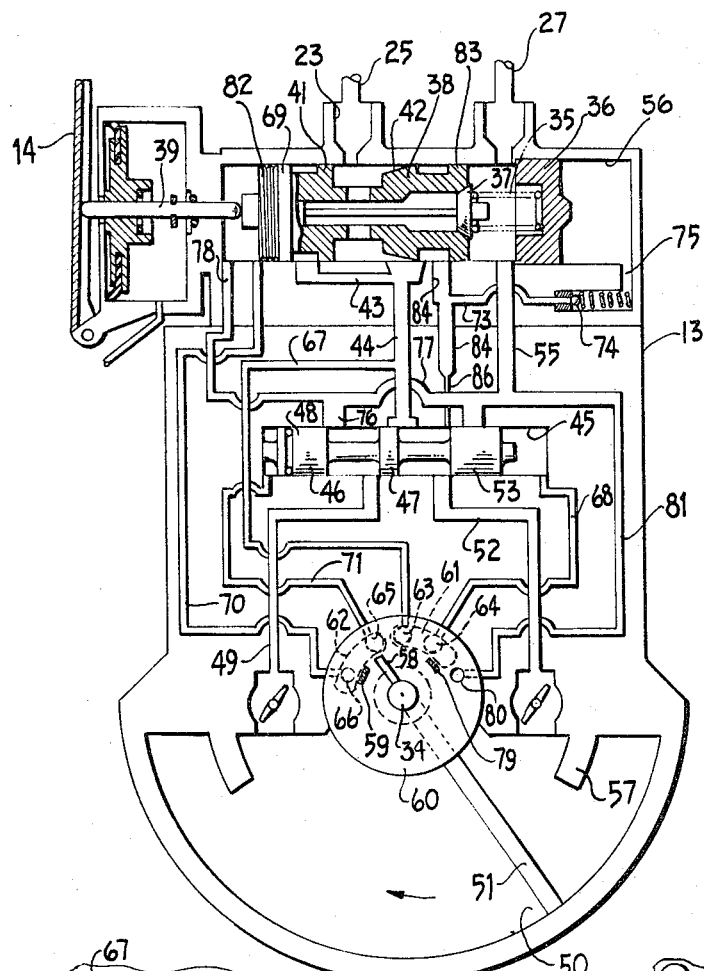
FIG. 3 is a schematic view of the improved wiper motor of the present invention with its movable parts in the position which they assume immediately after the motor is caused to start up from its parked position.

When it is desired to start wiper motor operation, it is merely necessary to manipulate control 14' (FIG. 1) to thereby cause lever 14 to move from the position shown in FIG. 2 to the position shown in FIG. 3. This will cause stem 39 to move to the right and thereby cause control valve 38 to move from the position shown in FIG. 2 the position shown in FIG. 3. First of all, after the foregoing movement has taken place, the hydraulic pressure which is supplied to wiper motor 13 is increased because valve 37 is caused to seat more firmly on the seat of control valve 38, as described in detail in said Patent No. 3,100,423, because the pressurized fluid between lands 41 and 42 is applied to the right of piston 36 through the right end portion of conduit 43, between lands 42 and 83 in control valve chamber 56, through conduit 73, past spring biased check valve 74, and through conduit 75 entering to the right of piston 36. Because the hydraulic pressure on the left face of piston 36 is the lower exhaust pressure and because the hydraulic pressure on the right face of piston 36 is the higher inlet pressure, piston 36 will move to the left until such time as it comes into abutting engagement with the shoulders (not numbered) within control valve chamber 56. The movement of piston 36 to the left which occurs as a result of the movement of control valve 38 to the right will cause a compression of spring 35 therebetween to thereby cause valve 37 to seat more firmly on control valve 38 to thereby build up the pressure supplied to motor 13 to insure proper wiper motor operation.

After the movement of control valve 38 has been effected to provide the above-described sequence of events, shuttle valve 48 will move from the position shown in FIG. 2 to the position shown in FIG. 3 to thereby effect communication between conduit 44 leading from wiper motor inlet 23 and the portion of chamber 50 to the right of piston 51 through the portion of shuttle valve chamber 45 now lying between lands 47 and 53, and conduit 52. At this time the portion of chamber 50 to the left of piston 51 is in communication with the exhaust conduit 27 of wiper motor 13 through conduit 49, the portion of shuttle valve chamber 45 now lying between lands 47 and 48, conduit 76, conduit 77, conduit 55 and the portion of control valve chamber 56 lying between piston 36 and control valve 38. The foregoing movement can occur because immediately after control valve 38 was moved to the position shown in FIG. 3 from the position shown in FIG. 2, the portion of shuttle valve chamber 45 to the right of shuttle valve 48 remained exposed to high pressure inlet fluid, as described in detail above, while the portion of shuttle valve chamber to the left of land 48 was reduced to exhaust pressure, notwithstanding that pilot valve 60 remained in the same position in FIG. 3 which it occupied in FIG. 2 while the wiper motor was parked. More specifically, immediately after the movement of control valve 38 to the right, the inlet pressure in conduit 44 remained in communication with shuttle valve chamber to the right of land 53 through conduit 67, aperture 63, pilot valve groove 61, aperture 64, and conduit 68. However, the portion of shuttle valve chamber 45 to the left of land 48 was exposed to exhaust conduit 27 through conduit 71, aperture 65, pilot valve groove 62, aperture 66, conduit 70, the portion of control valve chamber 56 to the left of land 69, and conduit 78 which is in communication with conduit 77 leading to exhaust conduit 55, which is, in turn, in communication with conduit 27 through control valve chamber 56.

Figure 5:
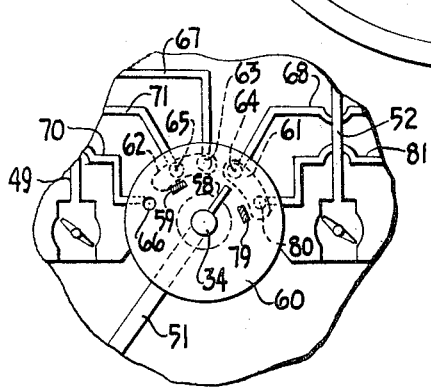
FIG. 5 is a schematic view showing the position of the pilot valve of the wiper motor when the motor piston is travelling in a counterclockwise direction.

The foregoing movement of piston 51 in a clockwise direction will continue until such time as kicker 58 engages abutment 79 and causes pilot valve 60 to pivot in a clockwise direction on shaft 34 from a position shown in FIGURES 2 and 3 to the position shown in FIGURE 5. This will cause shuttle valve 48 to move to the right from the position shown in FIG. 3 to the position shown in FIG. 4 to thereby reroute hydraulic fluid so that the portion of chamber 50 to the left of piston 51 is exposed to high pressure inlet fluid while the portion of chamber 50 to the right of piston 51 is in communication with the exhaust conduit 27 of wiper motor 13. More specifically, shuttle valve 48 will shift to the right because high pressure hydraulic fluid is now applied to shuttle valve chamber 45 to the left of land 46 through conduit 67, aperture 63, groove 62, aperture 65 and conduit 71. Furthermore the right end of shuttle valve chamber 45 to the right of land 53 is in communication with exhaust conduit 55 through conduit 64, aperture 68, pilot valve groove 61, aperture 80, conduit 81 and conduit 77. After shuttle valve 48 has shifted to the right, the paths of communication between the inlet and exhaust conduits and the opposite sides of piston 51 will be the same as described above with respect to FIG. 2 and therefore need not be repeated at this time. This will cause piston 51 to again move in a counterclockwise direction until such time as kicker 58 again engages abutment 59 to thereby pivot pilot valve 60 in a counterclockwise direction and cause the shifting of shuttle valve 46 to thereby cause pressure to be applied to the right side of piston 51 to cause it to again travel in a clockwise direction. The foregoing operation is constantly repeated to cause oscillation of piston 51 to thereby cause motor 13 to provide the above-mentioned oscillatory output.

When it is desired to park wiper motor 13, it is merely necessary to manipulate control 14' on the vehicle dashboard to thereby cause lever 14 to pivot in a counterclockwise direction in FIG. 2. The expansion of spring 35 will cause control 38 to move to the left to assume the position shown in FIG. 2. The movement of control valve 38 can be effected by the vehicle operator while piston 51 is traveling either in a clockwise direction (FIG. 3) or in a counterclockwise direction. When piston 51 is traveling in a clockwise direction, shuttle valve 46 and pilot valve 60 are in the position shown in FIG. 3. If piston 51 is traveling in a counterclockwise direction, pilot valve 60 is in the position shown in FIG. 5 and shuttle valve 46 is in the position shown in FIG. 2 so that the left side of piston 51 is exposed to high pressure and the right side of piston 51 is in communication with exhaust conduit 55 as described above relative to FIG. 2. Therefore piston 51 will move to the position shown in FIG. 2 and stop. However, prior to stopping, kicker 58 will engage abutment 59 on pilot valve 60 and cause the latter to move from the position shown in FIG. 5 to the position shown in FIG. 2. Therefore since control valve 38 had previously been moved to the position shown in FIG. 2, the movement of pilot valve 60 will merely cause high pressure fluid to be applied to shuttle valve chamber 45 to the right of land 53 in addition to the high pressure previously applied to the left of land 46 which caused shuttle valve 48 to move to its position shown in FIG. 2 prior to the time that counterclockwise movement of piston 51 was effected. After piston 51 reaches the position shown in FIG. 2, the wiper motor will stop.

As noted above, it is also possible for control valve 38 to be moved to the position shown in FIG. 2 while piston 51 is moving in the clockwise direction shown in FIG. 3. If this is the case, shuttle valve 48 and pilot valve 60 will be in the position shown in FIG. 3 and the routing of hydraulic fluid to and from opposite sides of piston 51 will continue to cause piston 51 to move in a clockwise direction in FIG. 3. However, kicker 58 will eventually engage abutment 79 and shift pilot valve 60 from the position shown in FIG. 3 to the position shown in FIG. 5. Thereupon the portion of chamber 45 to the right of land 53 of shuttle valve 38 will be exhausted and the portion of chamber 45 to the left of land 46 will be exposed to high pressure to shift shuttle valve 48 from the position shown in FIG. 3 to the position shown in FIG. 2, whereupon high pressure fluid will be applied to chamber 50 to the left of piston 51, and the portion of chamber 50 to the right of piston 51 will be in communication with exhaust conduit 55 so that piston 51 will be caused to travel in a counterclockwise direction until such time as it engages abutment 57, as shown in FIG. 2, and pilot valve 60 shifts from the position shown in FIG. 5 to the position shown in FIG. 2 to cause high pressure hydraulic fluid to be applied to the portion of shuttle valve chamber 45 to the right of land 53 in addition to being applied to the portion of chamber 45 to the left of land 46 through the paths described in detail above.

With the construction of the present invention it is impossible for the load of the wiper motor 13 to be applied to pump 17 without the vehicle operator's knowledge thereby obviating the possibility that such load will be added for great lengths of time to the normal load of the power steering motor on pump 17. More specifically, if the vehicle operator should not manipulate control 14' to cause control valve 38 to move fully to the position shown in FIG. 2 from the position shown in FIGS. 3 and 4, land 83 will obstruct the end of conduit 84 but there will be a certain amount of seepage of high pressure fluid from conduit 43 into conduit 84 past land 83. However at this time, land 69 will not be in a position in FIG. 2 where it permits conduit 70 to be in partial communication with chamber 56. In other words land 69 will obstruct the end of conduit 70 leading from control valve chamber 56. Therefore the high pressure hydraulic fluid in conduit 43 will not be able to enter conduit 70 at full inlet pressure but will be metered by land 69. However, since the pressure in conduit 70 is low, the pressure in shuttle valve chamber 45 to the left of land 46 will also be low because this chamber is in communication with conduit 70 through aperture 66, pilot valve groove 62, aperture 65, and conduit 71. Since high pressure hydraulic fluid will be present in the portion of shuttle valve chamber 45 to the right of land 53, and since the portion of said chamber to the left of land 46 is subjected to relatively low pressure, shuttle valve 48 will slowly shift from its position shown in FIG. 2 to its position shown in FIG. 3. When this occurs a single cycle of movement of piston 51 will be experienced, thereby alerting the vehicle operator that the wiper motor is not fully shut off. After the vehicle operator is thus alerted, he can manipulate control 14' to cause lever 14 to pivot a greater amount in counterclockwise direction in FIG. 2 to thereby permit control valve 38 to move to the position shown in FIG. 2. Furthermore it is to be noted that if there is any leakage past land 83 after control valve 38 has moved to the position shown in FIG. 2, such leakage instead of entering conduit 84 will enter the portion of control valve chamber 56 between valve 37 and piston 36 through the metering conduit 86. Thus there can be no build-up of pressure in conduit 73 leading to the right face of piston 36. This being the case, the hydraulic fluid which is trapped in the portion of chamber 56 to the right of piston 36 when the latter is in the position shown in FIG. 3 will seep past the piston into the portion of chamber 56 between the control valve 38 and piston 36, thereby permitting piston 36 to move from the position shown in FIG. 3 to the position shown in FIG. 2 with the attendant expansion of spring 35 to thereby release the force tending to cause valve 37 to be seated on control valve 38, to thereby reduce the pressure in conduit 25 leading to motor 13 from pump 17 and thereby insuring that the load produced by motor 13 on pump 17 when said motor is in operation is non-existent when wiper motor 13 is not in operation. It is to be noted, however, that while there is a flow of hydraulic fluid through conduit 84 and conduit 86 when control valve 38 is in the position shown in FIGURE 3, that is, while the wiper motor is running, the amount of such flow is minimal and will not affect normal wiper motor operation.

Incorporated into the improved wiper motor 13 of the present invention is an arrangement for providing automatic intermittent wiping with dwell periods between successive cycles of wiper movement. More specifically, the left end of land 69 of control valve 38 has a thread 82 formed thereon. When it is desired to cause wiper motor 13 to operate intermittently, it is merely necessary to manipulate control 14' on the vehicle dashboard so that lever 14 moves an amount which in turn causes control 38 to assume the position shown in FIG. 4, with threaded portion 82 lying between conduits 70 and 78. If this movement of control valve 38 is effected while the wiper motor shuttle valve 48 and pilot valve 60 are in the position shown in FIG. 2, the following will occur: High pressure hydraulic fluid will be applied from conduit 44, which is in communication with high pressure inlet 23, to the portion of shuttle valve chamber 45 to the right of land 53 through conduit 67, aperture 63, pilot valve groove 61, aperture 64 and conduit 68. However, the portion of shuttle valve chamber 45 to the left of land 46 will be in communication with exhaust conduit 77 through conduit 71, aperture 65, pilot valve groove 62, aperture 66, conduit 70, the portion of control valve chamber 56 now obstructed by threads 82 on control valve 38, and conduit 78. In effect, therefore, threads 82 provide a metering action so as to permit the portion of shuttle valve chamber 45 to the left of land 46 to bleed down slowly so that the high pressure to the right of land 53 will cause shuttle valve 48 to shift slowly. After it shifts, the portion of chamber 50 to the left of piston 51 will be in communication with exhaust conduit 77 through conduit 49, shuttle valve chamber 45 and conduit 54 and the portion of chamber 50 to the right of piston 51 will be in communication with inlet conduit 44 through shuttle valve chamber 45 and conduit 52 to thereby cause piston 51 to move in a clockwise direction. This movement will continue until such time as kicker 58 engages abutment 79 on the pilot valve and pivots pilot valve 60 in a clockwise direction so that it assumes the position shown in FIG. 5. Thereupon the flow to chamber 50 will be reversed so that high pressure fluid is applied to the portion of the chamber to the left of piston 51 and low pressure fluid is exhausted from the portion of chamber 50 to the right of piston 51. The foregoing occurs because the shifting of pilot valve 60 causes shuttle valve 48 to shift from the position shown in FIG. 3 to the position shown in FIG. 2. In other words, after pilot valve 60 moves to the position shown in FIG. 5, communication is established from high pressure conduit 44 to the portion of shuttle valve chamber 45 to the left of land 46 through conduit 67, aperture 63, groove 62 and conduit 71. Furthermore, the portion of shuttle valve chamber 45 to the right of land 53 is exhausted directly to exhaust conduit 77 through conduit 68, aperture 64, groove 61, aperture 80 and conduit 81. In other words when piston 51 changes from clockwise movement to counterclockwise movement, shuttle valve 48 shifts instantaneously to prevent a delay at the terminal portion of piston movement because there is no flow through conduits 70 and 78 during the movement of shuttle valve 48 from the position shown in FIG. 3 to the position shown in FIG. 4. However once piston 51 reaches the position shown in FIG. 4 so that pilot valve 60 moves from the position shown in FIG. 5 to the position shown in FIG. 4, the above-described delay in the movement of shuttle valve 48 from the position shown in FIG. 4 to the position shown in FIG. 3 will occur because of the metering action of threads 82 on control valve 38 between conduits 70 and 78. By adjusting the amount of threads which lie between conduits 70 and 78, that is, by pushing control valve 38 accordingly, the length of time which it takes for high pressure in shuttle valve chamber 45 to the left of land 46 to dissipate will determine the amount of dwell provided by the wiper motor between successive cycles of operation.

Whenever it is desired to terminate intermittent operation it is merely necessary for the vehicle operator to manipulate control 14' to thereby cause control valve 38 to return to the position shown in FIG. 2 and if piston 51 is in the position shown in FIG. 4 when such movement takes place, the wiper motor will remain in a parked position. However if the movement of control valve 38 is effected while piston 51 is moving in a clockwise direction, the clockwise stroke will be completed and thereafter the wiper motor will automatically park by causing piston 51 to move in a counterclockwise direction until it engages abutment 57 and thereafter stop, as described in detail above.

It can thus be seen that by providing a threaded portion 82 on control valve 48 so as to meter the flow of hydraulic fluid between conduits 70 and 78 under certain circumstances, the wiper motor 13 can provide intermittent operation in addition to the continuous operation described above.

In FIG. 6 another feature of the present invention is disclosed. More specifically it is to be noted that the solid line portion of vanes 87 indicates their limit of travel in one direction during normal wiper motor operation and the dotted line positions of vanes 87 indicates the position which they occupy when the wiper motor is parked. In moving from the solid line position to the dotted line position, the vanes traverse an arc X and in so doing the tips of the vanes move along arcs 88 and 89 of conduits 49 and 52. It is to be noted that once the ends of vanes 87 reach their solid line position, the distance between the ends of the vanes and the arcs 88 and 89 remain constant so that the flow through conduits 49 and 52 remains constant after the solid line position is reached. This causes the piston 51 to move at a constant rate of speed from the end limit of movement during normal running to the limit of movement in its parked position. The foregoing can be more fully understood when it is appreciated that if the arcuate portions 88 and 89 were not provided so that the walls 90 and 91 of conduits 49 and 52 were straight, there would be an increased flow of fluid through conduits 49 and 52 after vanes 87 reached a horizontal position and thereafter moved away from the horizontal so that the parking which occurred would be while the piston 51 was increasing its speed and therefore would cause the wipers 28 to slam against the bottom molding of the windshield. In other words by causing the flow through conduits 49 and 52 to be at a constant rate between the end limit of piston travel experienced during normal running and the end position of parking, the above-mentioned slamming is eliminated and a "soft park" is obtained. The description of the manner in which vanes 87 operate has been eliminated from this description inasmuch as their function and mode of operation is fully described in the above-mentioned Patent No. 3,100,423.

It is again to be noted that wiper motor 13 may be identical in all respects to the wiper motor fully described in Patent No. 3,100,423 including the dampening vanes shown in said patent, except for the above-described structure which provides the above-enumerated results.

In FIG. 7 a modified form of control valve 38' is shown which may be identical in all respects to control valve 38 of the preceding figures except for the substitution of a tapered portion 82' at the end thereof for threaded portion 82 of the preceding figures. The control valve 38', by virtue of tapered portion 82', provides the same type of metering action during intermittent operation as does the threaded portion 82'. It will be appreciated that the amount by which tapered portion 82' obstructs the end of conduit 70 will be determine the amount of dwell between successive cycles of wiper operation.

Figure 8:
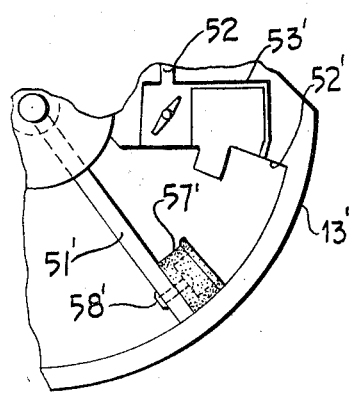
FIG. 8 depicts a modified construction for insuring a soft park.

In FIG. 8 a modified housing 13' is shown. This housing may be identical to the housing of the preceding figures in all respects except that a rubber piston 57' is mounted on piston 51' and the housing 13' has a cylinder portion 52' into which piston 57', which is attached to piston 51' by rivet 58', is adapted to move only when piston 51' moves from the end of its normal running limit of travel to its parking position. During such movement, the hydraulic fluid within cylinder 52' will be forced through conduit 53' into conduit 52 leading to the exhaust line from the motor. Since conduit 53' provides a restriction to the flow of hydraulic fluid, a soft parking action will be assured as the piston 51' moves from its normal running limit, wherein piston 57' is not within cylinder 52', to its parked position wherein piston 57' is located well within cylinder 52'. It is to be noted that the foregoing construction for providing a soft park can be utilized either with the vane construction of FIG. 6 or with the vane construction of the abovementioned Patent No. 3,100,423. However, it will be appreciated that in installations utilizing the soft park construction 52'–57' of FIG. 8, there is no need to utilize the vane construction of FIG. 6 for providing the soft park. It is again to be noted that all the valve structure of the motor shown in FIG. 8 may be identical to the valve structure shown in the preceding figures and that such valve structure has been omitted from FIG. 8 in the interest of brevity.

It is to be understood that the invention is not limited to the specific arrangement shown, but in its broadest aspects includes all equivalent embodiments and modifications which come within the scope of the invention.

What is claimed is:

1. A hydraulic windshield wiper motor comprising a housing, a piston mounted for oscillating movement in said housing, said piston dividing a portion of said housing into first and second chambers, control valve means for controlling flow of pressurized fluid from a fluid inlet through said motor to a discharge opening, fluid operated valve means for alternately routing pressurized hydraulic fluid to said first and second chambers while permitting the fluid in the other of said chambers to be exhausted, pilot valve means for routing hydraulic pressurized fluid to said fluid operated valve means, said control valve means including flow restricting means in circuit with said fluid operated valve means for delaying operation of said fluid operated valve means and controllable means for bypassing said flow restricting means to provide continuous wiper motor cycling.

2. A hydraulic windshield wiper motor comprising a housing, a piston mounted for oscillating movement in said housing, said piston dividing a portion of said housing into first and second chambers, manually operable control valve means for controlling flow of pressurized fluid from a fluid inlet through said motor to a discharge opening, said control valve movable to a first position for routing pressurized fluid through said motor to effect parking of said piston, said control valve movable to a second position for routing pressurized fluid through said motor to effect continuous oscillation of said piston, said control valve movable to an intermittent dwell range for producing dwell periods between cycles of piston movement, said control valve being movable within said intermittent dwell range to effect variation in the duration of said dwell periods, fluid operated valve means for alternately routing pressurized hydraulic fluid to said first and second chambers while permitting the fluid in the other of said chambers to be exhausted, pilot valve means actuated by said piston for routing pressurized hydraulic fluid to said fluid operated valve means and flow restricting means effectively in circuit with said fluid operated valve means when said control valve is positioned within said intermittent dwell range.

3. A hydraulic windshield wiper motor for providing either a continuous oscillatory output or an intermittent output with intervening dwell periods between successive cycles of motor movement comprising a housing, a first chamber in said housing, a piston mounted for oscillatory movement in said first chamber, a second chamber in said housing, a control valve in said second chamber movable to first and second positions, conduit means for effecting communication between said first and second chambers, valve means operatively associated with said conduit means for alternately causing the flow of said hydraulic fluid to opposite sides of said piston to thereby effect said oscillatory movement, second conduit means for supplying pressurized hydraulic fluid to said valve means to thereby periodically actuate said valve means to effect said alternate flow of hydraulic fluid to said piston to thereby effect said continuous oscillatory output when said control valve is in said first position, and metering means on said control valve operable when said control valve is in said second position for throttling the flow of hydraulic fluid relative to said valve means when said valve means reaches a predetermined position to thereby delay the movement of said valve means and thereby cause a temporary cessation of the supplying of said hydraulic fluid to said first chamber to thereby cause said piston to remain at rest until said flow of fluid relative to said valve means has been completed through said throttling means to thereby provide said intermittent output.

4. A hydraulic windshield wiper motor comprising a housing, piston means mounted for oscillatory movement in said housing, control means for causing said piston means to oscillate or to be in a parked position, valve means and conduit means operable in response to said control means for routing hydraulic fluid through said housing to thereby effect oscillation of said piston means, vane means operatively associated with said conduit means for restricting the flow of hydraulic fluid relative to said piston means during the terminal portions of travel of said piston means to thereby cause said piston means to move more slowly during said terminal portion of travel, said piston means being oscillatable through a running range when said control means is set to provide oscillatory movement of said piston means and being movable through a parking range beyond said running range when said control means are moved to a position to effect parking of said piston means, and means operatively associated with said vane means for causing a substantially constant flow of hydraulic fluid relative to said piston means during the movement thereof in said parking range to thereby cause said piston means to move to said parked position at a substantially constant speed.

References Cited by the Examiner

UNITED STATES PATENTS

| 826,274 | 9/1905 | Richardson | 91—310 |
|---|---|---|---|
| 2,260,852 | 10/1941 | Buchmann | 91—219 |
| 3,100,423 | 8/1963 | D'Alba | 91—310 |
| 3,190,184 | 6/1965 | Carpenter | 91—219 |

FOREIGN PATENTS 379,979   9/1932   Great Britain.

EDGAR W. GEOGHEGAN, *Primary Examiner.*

SAMUEL LEVINE, MARTIN P. SCHWADRON,
*Examiners.*

P. E. MASLOUSKY, *Assistant Examiner.*